(12) United States Patent
Li et al.

(10) Patent No.: US 11,692,904 B1
(45) Date of Patent: Jul. 4, 2023

(54) BOSS STRUCTURE SEALING EXPERIMENT DEVICE AND SYSTEM FOR IV TYPE HYDROGEN STORAGE CYLINDER, AND TEST METHOD

(71) Applicant: ZHEJIANG UNIVERSITY OF TECHNOLOGY, Zhejiang (CN)

(72) Inventors: Yuebing Li, Zhejiang (CN); Zhouxin Pan, Zhejiang (CN); Jiqi Zhu, Zhejiang (CN); Zengliang Gao, Zhejiang (CN); Weiya Jin, Zhejiang (CN); Xing He, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 0 days.

(21) Appl. No.: 17/965,772

(22) Filed: Oct. 14, 2022

(30) Foreign Application Priority Data

Mar. 8, 2022 (CN) .......................... 202210217888.9

(51) Int. Cl.
*G01M 3/32* (2006.01)

(52) U.S. Cl.
CPC ................. *G01M 3/3281* (2013.01)

(58) Field of Classification Search
CPC ...... G01M 3/00; G01M 13/00; G01M 13/005; G01M 3/18; G01M 3/183; G01M 3/184; G01M 3/14; G01M 3/143; G01M 3/144
See application file for complete search history.

(56) References Cited

FOREIGN PATENT DOCUMENTS

CN 106706220 A * 5/2017

* cited by examiner

*Primary Examiner* — Harshad R Patel
*Assistant Examiner* — Truong D Phan
(74) *Attorney, Agent, or Firm* — JCIPRNET

(57) ABSTRACT

A boss structure sealing experiment device for an IV type hydrogen storage cylinder. The device includes a high-pressure chamber, a sealing leakage structure, a cylinder mouth valve, and a low-pressure chamber, where the high-pressure chamber, the sealing leakage structure, and the low-pressure chamber are tightly connected to one another through flange bolts, and the cylinder mouth valve is tightly connected to the high-pressure chamber through threads. Further disclosed is a sealing experiment system. The system includes a boss structure sealing experiment device, a high-pressure gas supply device, and a leaked gas detection device. The high-pressure gas supply device consists of a hydrogen source, a compressor, a buffer tank, a valve, and a pressure gauge; and the leaked gas detection device consists of a gas mixing chamber, a carrier gas, and a gas leakage detector. Further disclosed is a test method for a boss structure sealing experiment.

9 Claims, 4 Drawing Sheets

BOSS STRUCTURE SEALING EXPERIMENT DEVICE AND SYSTEM FOR IV TYPE HYDROGEN STORAGE CYLINDER, AND TEST METHOD

CROSS-REFERENCE TO RELATED APPLICATION

This application claims the priority benefit of China application no. 202210217888.9, filed on Mar. 8, 2022. The entirety of each of the above-mentioned patent applications are hereby incorporated by reference herein and made a part of this specification.

TECHNICAL FIELD

The present disclosure belongs to the technical field of hydrogen storage cylinders, and in particular to a boss structure sealing experiment device and system for an IV type hydrogen storage cylinder, and a test method.

BACKGROUND ART

The excellent and clean hydrogen energy has drawn the worldwide attention, and been vigorously developed in every country. In China, in consideration of the booming development of the hydrogen energy in automobiles, as well as the actual application of the hydrogen energy in automobile industry, it is still urgent to solve the sealing issue of the cylinder mouth sealing structure of the hydrogen storage cylinder.

The IV type hydrogen storage cylinder structurally includes a plastic lining, a carbon fiber winding layer, and a glass fiber winding layer from inside to outside. The boss structure is used as a fixing and guiding structure between the plastic lining and the metal cylinder valve for ensuring the seal connection between the plastic lining and the metal cylinder valve. Owing to the requirements for the strength and stiffness, the boss structure is required to be made of the metal material. In a number of existing patent technologies, the plastic lining is connected to the boss structure mostly upon the direct molding through the injection molding process or welding connection. In the injection molding process, the metal is directly wrapped around the plastic, resulting in the poor connection therebetween, and the two materials are likely to be layered, thus causing the leakage. The welding connection will lead to a welding joint at the cylinder mouth of the lining, which becomes the leakage point of the gas cylinder. Owing to the sealing complexity of the cylinder mouth structure of the IV type hydrogen storage cylinder and the importance of the sealing function of the boss structure in the IV type hydrogen storage cylinder, it is of great importance to develop an experiment device and system for researching the sealing performance of the boss structure of the IV type hydrogen storage cylinder, and a test method.

SUMMARY

In view of the problems described above in the prior art, an objective of the present disclosure is to provide a boss structure sealing experiment device and system for an IV type hydrogen storage cylinder, and a test method.

The present disclosure provides the technical solution as follows:

A boss structure sealing experiment device for an IV type hydrogen storage cylinder includes a high-pressure chamber, a sealing leakage structure, a cylinder mouth valve, and a low-pressure chamber, the high-pressure chamber being tightly connected to the sealing leakage structure through a bolt, the sealing leakage structure being tightly connected to the low-pressure chamber through a bolt, upper and lower end portions of the sealing leakage structure being provided with sealing rings, the sealing rings being compressed under the action of fastening of the bolts, the cylinder mouth valve being arranged in the sealing leakage structure, and in seal connection to an inner wall of the sealing leakage structure, and the cylinder mouth valve being internally provided with an internal thread.

As a further technical solution, a cavity of the high-pressure chamber is internally provided with a raised threaded column, the threaded column being provided with an external thread matching the internal thread, the threaded column being in threaded connection to the cylinder mouth valve, to provide a pre-tightening sealing force for a leakage contact surface of the sealing leakage structure, the high-pressure chamber is further provided with two high-pressure gas inlets and outlets, to pressurize and depressurize high-pressure gas, and a flange of the high-pressure chamber being provided with first bolt holes distributed in a circumferential direction, to be tightly connected to the sealing leakage structure.

As a further technical solution, the sealing leakage structure includes a plastic lining and a boss structure, the plastic lining being assembled to the boss structure in a matching manner through a trapezoidal groove.

As a further technical solution, upper and lower end surfaces of the boss structure are provided with sealing grooves, the sealing groove being internally provided with a sealing ring, and the boss structure being provided with second bolt holes distributed in a circumferential direction, to be tightly connected to the high-pressure chamber through the second bolt holes, so as to compress the sealing rings, so that air tightness of the boss structure sealing experiment device is enhanced.

As a further technical solution, the cylinder mouth valve is provided with a sealing belt groove, a sealing belt, and an internal thread, the sealing belt being in interference fit with the sealing belt groove, an outer surface of the sealing belt being designed into a conical surface and provided with a rubber bulge, an inner surface of the plastic lining being designed to be tapered, and the outer conical surface of the sealing belt being in interference fit with the inner surface of the plastic lining, so as to realize sealing performance experiments under different contact pressures.

As a further technical solution, the low-pressure chamber is provided with a leaked gas outlet and a third bolt hole, so as to provide a leaked gas detection channel, and to realize tight connection to the sealing leakage structure.

The present disclosure further provides a boss structure sealing experiment system for an IV type hydrogen storage cylinder. The system includes the boss structure sealing experiment device as described above, a high-pressure gas supply device, and a leaked gas detection device.

As a further technical solution, the high-pressure gas supply device includes a hydrogen source, a compressor, a buffer tank, a first valve, a pressure gauge, and a second valve which are connected through pipelines.

As a further technical solution, the leaked gas detection device includes a gas mixing chamber, a carrier gas, and a gas leakage detector.

The present disclosure further provides a test method for the boss structure sealing experiment system for an IV type hydrogen storage cylinder as described above. The method includes:

(1) connecting a boss structure sealing experiment device, a high-pressure gas supply device, and a leaked gas detection device to one another through high-pressure pipelines;

(2) turning on a compressor and opening a first valve in the high-pressure gas supply device, providing hydrogen by a hydrogen source, compressing the hydrogen by a compressor, to enter a buffer tank, observing a reading of a pressure gauge, opening a second valve when the hydrogen is compressed to reach a stable pressure, and enabling high-pressure hydrogen to enter a high-pressure chamber of the boss structure sealing experiment device; and (3) enabling the high-pressure hydrogen in the high-pressure chamber to leak into a low-pressure chamber through a contact surface between a sealing leakage structure and a cylinder mouth valve, utilizing carrier gas in the leaked gas detection device to carry leaked hydrogen into a gas mixing chamber for mixing, and utilizing a gas leakage detector to detect the gas leakage amount.

By employing the technical solution described above, compared with the prior art, the present disclosure has the beneficial effects as follows:

1) In the present disclosure, the high-pressure chamber is provided with the threaded column which is tightly connected to the internal thread of the cylinder mouth valve, so as to provide different contact surface sealing pre-tightening forces for a leakage interface between the sealing leakage structure and the cylinder mouth valve.

2) In the present disclosure, the high-pressure chamber, the sealing leakage structure, the cylinder mouth valve, and the low-pressure chamber are tightly connected to one another through the bolts, and sealing gaskets are compressed, so that air tightness of an entire boss structure sealing experiment device in a sealing experiment process is ensured.

3) In the present disclosure, an inner surface of the boss structure in the leakage sealing structure is provided with a dented trapezoidal groove which is in interference fit with the plastic lining, so that connection stability between the boss structure and the plastic lining is ensured.

4) In the present disclosure, the inner surface of the cylinder mouth valve is provided with the internal thread which is tightly connected to the threaded column of the high-pressure chamber, so as to provide the contact surface pre-tightening force for the sealing experience.

5) In the present disclosure, the cylinder mouth valve is provided with the sealing belt groove which matches the sealing belt, the outer surface of the sealing belt is provided with a taper and an annular sealing bulge, and the sealing belt is in interference fit with the inner tapered surface of the plastic lining, so that different compression amounts are provided for the boss structure sealing experiment.

6) In the present disclosure, the buffer tank of the high-pressure gas supply device provides high-pressure hydrogen having different pressures and temperatures; and the rubber sealing belt of the cylinder mouth valve and the plastic lining of the sealing leakage structure provide different sealing element compression amounts and pre-tightening forces.

In conclusion, the present disclosure may satisfy boss structure sealing performance experiences under different pressures, temperatures, compression amounts, pre-tightening forces, etc.

DETAILED DESCRIPTION OF THE EMBODIMENTS

In order to make the objective, technical solution, and advantages of the present disclosure more clear and understandable, the present disclosure is further described in detail below with reference to the accompanying drawings in the description. It should be understood that the specific embodiments described herein are merely illustrative of the present disclosure, and are not intended to limit the present disclosure.

On the contrary, the present disclosure is to encompass any alternatives, modifications, equivalents, and solutions made within the spirit and scope of the present disclosure, as defined by the appended claims. Further, in the follow detailed description of the present disclosure, some specific details are described thoroughly, so that people will have a better understanding of the present disclosure. Those skilled in the art may also fully understand the present disclosure without these details.

Figure 1:
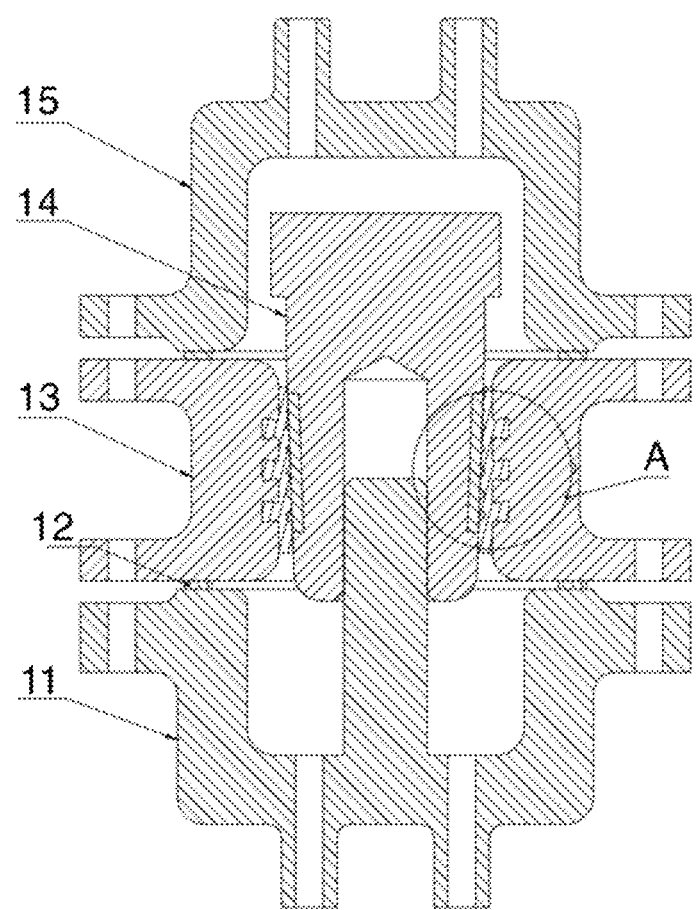
FIG. 1 is a schematic assembly diagram of a boss structure sealing experiment device in the present disclosure.

With reference to FIGS. 1-8, an assembly diagram of a boss structure sealing experiment device in the present disclosure is shown in FIG. 1. The boss structure sealing experiment device 1 is composed of a high-pressure chamber 11, a sealing ring 12, a sealing leakage structure 13, a cylinder mouth valve 14, and a low-pressure chamber 15. The high-pressure chamber 11 is tightly connected to the sealing leakage structure 13 through a bolt, the high-pressure chamber 11 is tightly connected to the cylinder mouth valve 14 through a bolt, and the sealing leakage structure 13 is tightly connected to the low-pressure chamber 15 through a bolt.

Figure 2:
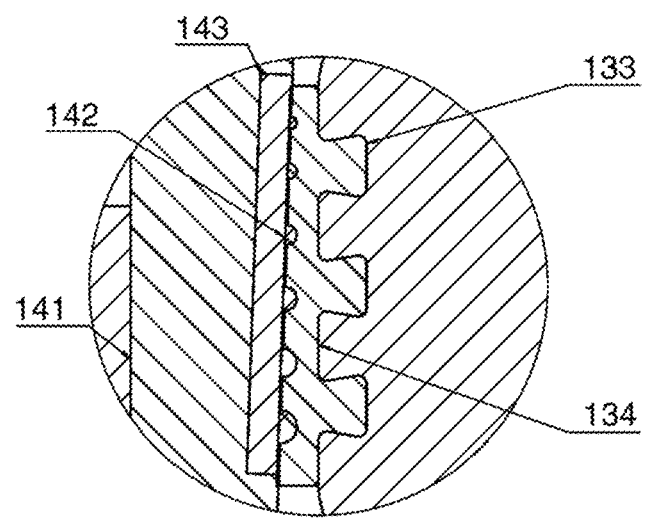
FIG. 2 is an enlarged schematic diagram of a local structure at portion A in FIG. 1.

A contact surface of a sealing element in the present disclosure is shown in FIG. 2. An outer surface of a sealing belt 142 of the cylinder mouth valve 14 is designed to be a conical surface, and the outer conical surface is provided with a rubber bulge in interference fit with an inner tapered surface of the plastic lining 134, so that different sealing element compression amounts may be provided for a boss structure sealing experiment.

Figure 3:
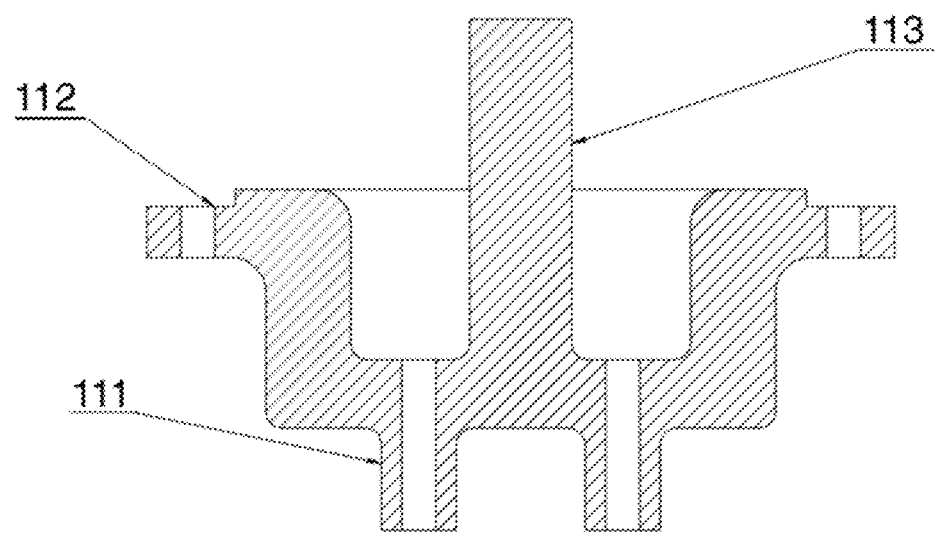
FIG. 3 is a structural schematic diagram of a high-pressure chamber in the present disclosure.

The high-pressure chamber in the present disclosure is structurally shown in FIG. 3. A cavity of the high-pressure chamber 11 is internally provided with a raised threaded column 113 for being connected to the cylinder mouth valve 14, and providing a pre-tightening force for a leakage contact surface of the sealing leakage structure 13. The high-pressure chamber 11 is provided with two high-pressure gas inlets and outlets 111, to pressurize and depressurize high-pressure gas. A flange of the high-pressure chamber 11 is provided with first bolt holes 112 distributed in a circumferential direction, to be tightly connected to the sealing leakage structure 13.

Figure 4:
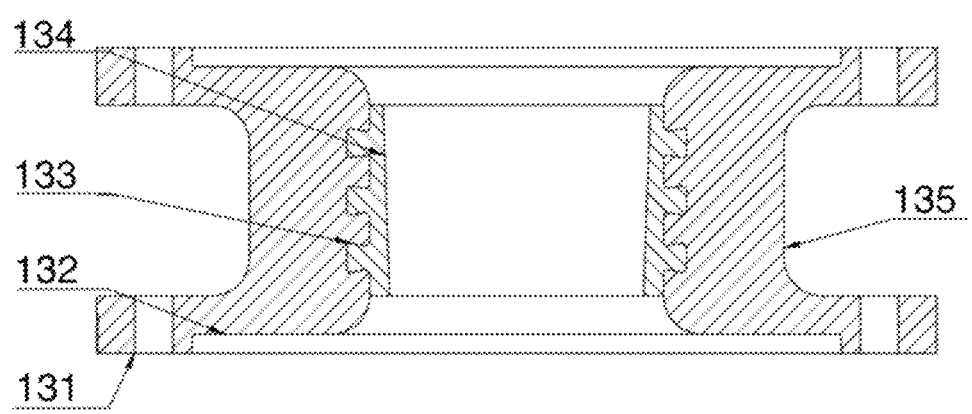
FIG. 4 is a structural schematic diagram of a sealing leakage structure in the present disclosure.
Figure 5:
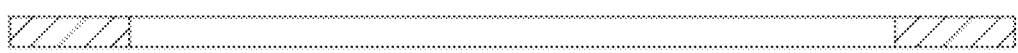
FIG. 5 is a structural schematic diagram of a sealing ring in the present disclosure.

The sealing leakage structure in the present disclosure is shown in FIG. 4. The sealing leakage structure 13 is composed of a plastic lining 134 and a boss structure 135, which are assembled in a matching manner through a trapezoidal groove 133. The boss structure 135 is provided with a sealing groove 132 and a second bolt hole 131, to be tightly connected to the high-pressure chamber 11 through the second bolt hole 131, so as to compress a sealing ring 12 in the sealing groove 132, so as to enhance air tightness of the device. The sealing ring 12 is structurally shown in FIG. 5. An inner surface of the plastic lining 134 is designed to be tapered, and in interference fit with the outer conical surface of the sealing belt 142 of the cylinder mouth valve 14, to realize sealing performance experiments under different contact pressures.

Figure 6:
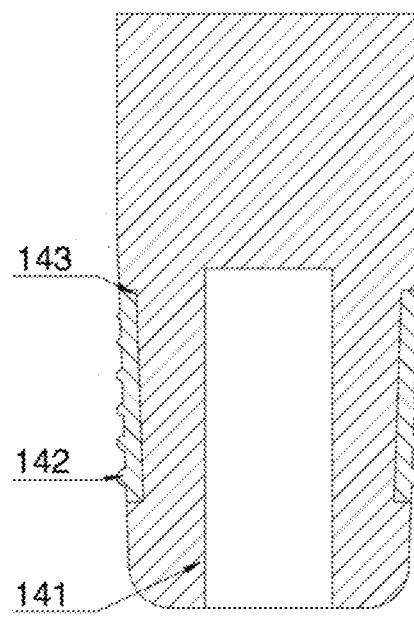
FIG. 6 is a structural schematic diagram of a cylinder mouth valve in the present disclosure.

The cylinder mouth valve in the present disclosure is structurally shown in FIG. 6. The cylinder mouth valve 14 is provided with a sealing belt groove 143, the sealing belt 142, and an internal thread 141. The sealing belt 142 is in interference fit with the sealing belt groove 143, and the internal thread 141 is in tight threaded connection to the threaded column 113, to provide different sealing pre-tightening force conditions for the boss structure sealing experiment device.

Figure 7:
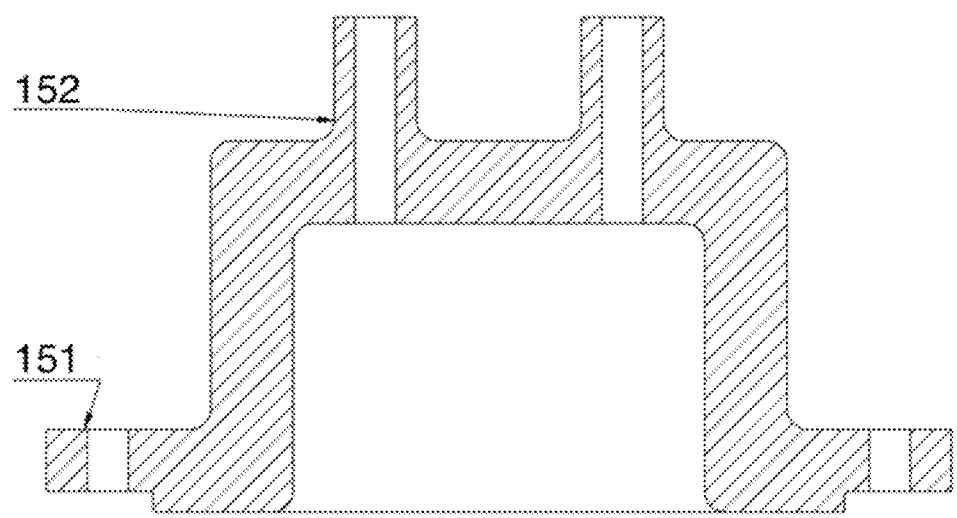
FIG. 7 is a structural schematic diagram of a low-pressure chamber in the present disclosure.

The low-pressure chamber in the present disclosure is structurally shown in FIG. 7. The low-pressure chamber 15 is provided with a leaked gas outlet 152 and a third bolt hole 151, to provide a leaked gas detection channel, and to realize tight connection to the sealing leakage structure 13.

Figure 8:
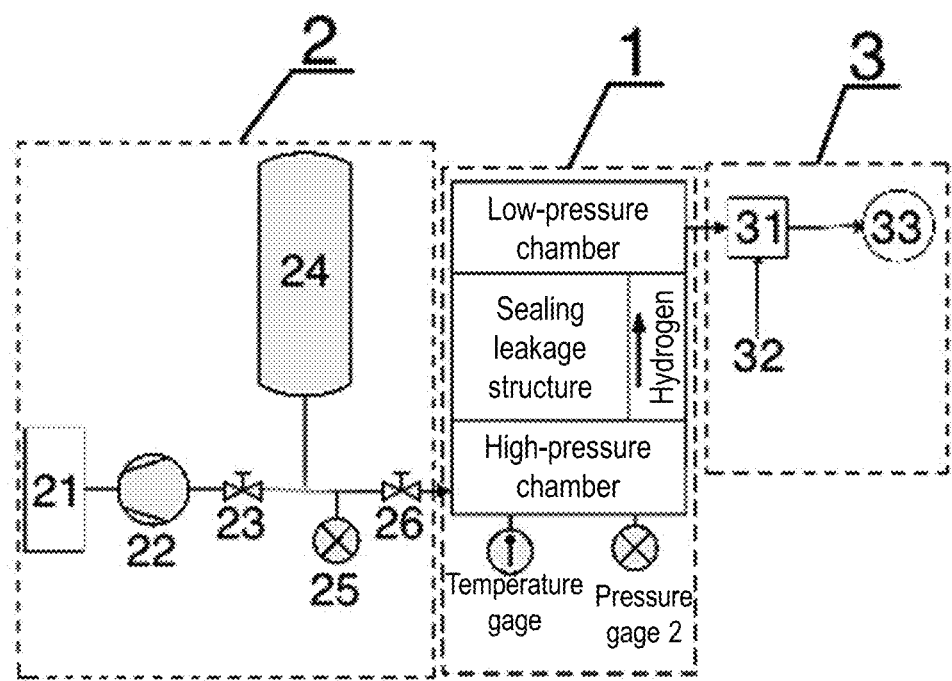
FIG. 8 is a structural schematic diagram of a boss structure sealing experience system in the present disclosure.

A boss structure sealing experiment system in the present disclosure is shown in FIG. 8. A boss structure sealing experiment device 1, a high-pressure gas supply device 2, and a leaked gas detection device 3 jointly constitute the boss structure sealing experiment system. The high-pressure gas supply device 2 includes a hydrogen source 21, a compressor 22, a buffer tank 24, a first valve 23, a pressure gauge 25, and a second valve 26 which are connected through pipelines. The leaked gas detection device 3 includes a gas mixing chamber 31, a carrier gas 32, and a gas leakage detector 33.

Carrying and mixing procedures of the leaked gas detection device 3 are provided mainly for uniformity and stability of a concentration of leaked gas. Gas carrying and mixing takes into account applicability of the device (which may ensure that different leaked media may all uniformly and stably enter the gas leakage detector 33 when being detected). If the leaked gas has a greater density than air or inert gas (avoiding air interference in a leakage chamber), and an outlet of the low-pressure chamber 15 is provided on a upper portion thereof, so that the leaked gas will not enter the detector. The inert gas is used as a carrier gas 32, and the low-pressure chamber 15 is provided with two holes, so that the carrier gas 32 enters from an inlet and exits from the outlet together with the leaked gas.

A test method for boss structure sealing performance in the present disclosure includes: a boss structure sealing experiment device 1, a high-pressure gas supply device 2, and a leaked gas detection device 3 are connected to one another through high-pressure pipelines. In the high-pressure gas supply device 2, a compressor 22 is turned on, and a first valve 23 is opened, hydrogen is provided by a hydrogen source 21, and compressed by a compressor 22, to enter a buffer tank 24. A reading of a pressure gauge 25 is observed. When the hydrogen is compressed to reach a stable pressure, a second valve 26 is opened. High-pressure hydrogen enters a high-pressure chamber 11 of the boss structure sealing experiment device 1. The high-pressure hydrogen in the high-pressure chamber 11 leaks into a low-pressure chamber 15 through a contact surface between a sealing leakage structure 13 and a cylinder mouth valve 14. A carrier gas 32 in the leaked gas detection device 3 carries leaked hydrogen into a gas mixing chamber 31 for mixing, and a gas leakage detector 33 detects the gas leakage amount.

In the present disclosure, control parameters of a boss structure sealing performance experiment are as follows: the buffer tank 24 of the high-pressure gas supply device 2 provides hydrogen having different pressures and temperatures; and a rubber sealing belt 142 of the cylinder mouth valve 14 and a plastic lining 134 of the sealing leakage structure 13 provide different sealing element compression amounts and pre-tightening forces. In conclusion, the present disclosure may satisfy boss structure sealing performance experiences under different pressures, temperatures, compression amounts, pre-tightening forces, etc.

What is described above is merely preferred embodiments of the present disclosure, and are not intended to limit the present disclosure. Any modifications, equivalents, improvements, etc. made within the spirit and principle of the present disclosure should all fall within the scope of protection of the present disclosure.

What is claimed is:

1. A boss structure sealing experiment device for an IV type hydrogen storage cylinder, comprising a high-pressure chamber, a sealing leakage structure, a cylinder mouth valve, and a low-pressure chamber, the high-pressure chamber being tightly connected to the sealing leakage structure through a bolt, the sealing leakage structure being tightly connected to the low-pressure chamber through a bolt, upper and lower end portions of the sealing leakage structure being provided with sealing rings, the sealing rings being compressed under an action of fastening of the bolts, the cylinder mouth valve being arranged in the sealing leakage structure, and in seal connection to an inner wall of the sealing leakage structure, and the cylinder mouth valve being internally provided with an internal thread, wherein a cavity of the high-pressure chamber is internally provided with a raised threaded column, the threaded column being provided with an external thread matching the internal thread, the threaded column being in threaded connection to the cylinder mouth valve, to provide a pre-tightening sealing force for a leakage contact surface of the sealing leakage structure, the high-pressure chamber is further provided with two high-pressure gas inlets and outlets, to pressurize and depressurize high-pressure gas, and a flange of the high-pressure chamber being provided with first bolt holes distributed in a circumferential direction, to be tightly connected to the sealing leakage structure, wherein the sealing leakage structure comprises a plastic lining and a boss structure, the plastic lining being assembled to the boss structure in a matching manner through a trapezoidal groove.

2. The boss structure sealing experiment device for an IV type hydrogen storage cylinder according to claim 1, wherein upper and lower end surfaces of the boss structure are provided with sealing grooves, the sealing groove being internally provided with a sealing ring, and the boss structure being provided with second bolt holes distributed in a circumferential direction, to be tightly connected to the high-pressure chamber through the second bolt holes, so as to compress the sealing rings, so that air tightness of the boss structure sealing experiment device is enhanced.

3. The boss structure sealing experiment device for an IV type hydrogen storage cylinder according to claim 2, wherein the cylinder mouth valve is provided with a sealing belt groove, a sealing belt, and an internal thread, the sealing belt being in interference fit with the sealing belt groove, an outer surface of the sealing belt being designed into a conical surface and provided with a rubber bulge, an inner surface of the plastic lining being designed to be tapered, and the outer conical surface of the sealing belt being in interference fit with the inner surface of the plastic lining, so as to realize sealing performance experiments under different contact pressures.

4. A boss structure sealing experiment system for an IV type hydrogen storage cylinder, comprising the boss structure sealing experiment device according to claim 3, a high-pressure gas supply device, and a leaked gas detection device,
wherein the high-pressure gas supply device comprises a hydrogen source, a compressor, a buffer tank, a first valve, a pressure gauge, and a second valve which are connected through pipelines,
wherein the leaked gas detection device comprises a gas mixing chamber, a carrier gas, and a gas leakage detector.

5. A boss structure sealing experiment system for an IV type hydrogen storage cylinder, comprising the boss structure sealing experiment device according to claim 2, a high-pressure gas supply device, and a leaked gas detection device,
wherein the high-pressure gas supply device comprises a hydrogen source, a compressor, a buffer tank, a first valve, a pressure gauge, and a second valve which are connected through pipelines,
wherein the leaked gas detection device comprises a gas mixing chamber, a carrier gas, and a gas leakage detector.

6. The boss structure sealing experiment device for an IV type hydrogen storage cylinder according to claim 1, wherein the low-pressure chamber is provided with a leaked gas outlet and a third bolt hole, so as to provide a leaked gas detection channel, and to realize tight connection to the sealing leakage structure.

7. A boss structure sealing experiment system for an IV type hydrogen storage cylinder, comprising the boss structure sealing experiment device according to claim 6, a high-pressure gas supply device, and a leaked gas detection device,
wherein the high-pressure gas supply device comprises a hydrogen source, a compressor, a buffer tank, a first valve, a pressure gauge, and a second valve which are connected through pipelines,
wherein the leaked gas detection device comprises a gas mixing chamber, a carrier gas, and a gas leakage detector.

8. A boss structure sealing experiment system for an IV type hydrogen storage cylinder, comprising the boss structure sealing experiment device according to claim 1, a high-pressure gas supply device, and a leaked gas detection device,
wherein the high-pressure gas supply device comprises a hydrogen source, a compressor, a buffer tank, a first valve, a pressure gauge, and a second valve which are connected through pipelines,
wherein the leaked gas detection device comprises a gas mixing chamber, a carrier gas, and a gas leakage detector.

9. A test method for the boss structure sealing experiment system for an IV type hydrogen storage cylinder according to claim 8, comprising:
(1) connecting a boss structure sealing experiment device, a high-pressure gas supply device, and a leaked gas detection device to one another through high-pressure pipelines;
(2) turning on a compressor and opening a first valve in the high-pressure gas supply device, providing hydrogen by a hydrogen source, compressing the hydrogen by a compressor, to enter a buffer tank, observing a reading of a pressure gauge, opening a second valve when the hydrogen is compressed to reach a stable pressure, and enabling high-pressure hydrogen to enter a high-pressure chamber of the boss structure sealing experiment device; and
(3) enabling the high-pressure hydrogen in the high-pressure chamber to leak into a low-pressure chamber through a contact surface between a sealing leakage structure and a cylinder mouth valve, utilizing carrier gas in the leaked gas detection device to carry leaked hydrogen into a gas mixing chamber for mixing, and utilizing a gas leakage detector to detect the gas leakage amount.

* * * * *